United States Patent [19]

Upton et al.

[11] Patent Number: 5,362,073
[45] Date of Patent: Nov. 8, 1994

[54] COMPOSITE SEAL FOR ROTARY CONE ROCK BITS

[75] Inventors: Robert G. Upton, Montgomery; Michael F. Hooper, Spring; Gary Portwood, Katy; Jerry Pyka, Houston; Randy Johnston; Robert Chambers, both of Conroe, all of Tex.

[73] Assignee: Smith International, Inc., Houston, Tex.

[21] Appl. No.: 964,673

[22] Filed: Oct. 21, 1992

[51] Int. Cl.⁵ .............................................. F16J 15/34
[52] U.S. Cl. ....................... 277/92; 277/177; 277/180; 277/227; 277/DIG. 6
[58] Field of Search ............... 277/92, 138, 165, 177, 277/180, 227, 228, DIG. 6

[56] References Cited

U.S. PATENT DOCUMENTS

| | | | |
|---|---|---|---|
| 2,953,398 | 9/1960 | Haugen et al. | 277/227 |
| 3,004,783 | 10/1961 | Webb | 277/227 |
| 3,397,928 | 8/1968 | Galle | 277/92 |
| 3,765,495 | 10/1973 | Murdoch | 175/371 |
| 3,788,654 | 1/1974 | Mandley | 277/229 |
| 3,879,044 | 4/1975 | Estes | 277/227 |
| 3,918,726 | 11/1975 | Kramer | 277/227 |
| 3,970,321 | 7/1976 | Dechavanne | 277/188 A |
| 3,990,751 | 11/1976 | Murdoch | 308/8.2 |
| 4,032,159 | 6/1977 | Zitting | 277/165 X |
| 4,066,269 | 1/1978 | Linne | 277/228 |
| 4,195,852 | 4/1980 | Roley et al. | 277/92 |
| 4,277,109 | 7/1981 | Crow | 308/8.2 |
| 4,344,629 | 8/1982 | Oelke | 277/95 X |
| 4,348,065 | 9/1982 | Yoshioka et al. | 308/9 |
| 4,431,704 | 2/1984 | Springer | 428/450 |
| 4,466,621 | 8/1984 | Garner et al. | 277/92 X |
| 4,519,614 | 5/1985 | Garner | 277/84 |
| 4,619,534 | 10/1986 | Daly et al. | 384/94 |
| 4,747,604 | 5/1988 | Nakamura | 277/177 X |
| 4,753,304 | 6/1988 | Kelly, Jr. | 277/92 X |
| 5,264,290 | 11/1993 | Touchet et al. | 428/492 |

Primary Examiner—William A. Cuchlinski, Jr.
Assistant Examiner—John L. Beres
Attorney, Agent, or Firm—Robert G. Upton

[57] ABSTRACT

An elastomeric o-ring rock bit seal is disclosed with two or more integrally bonded elastomers or phenolic type materials joined together to form the seal. The dynamic sealing face adjacent the journal bearing is fabricated from an elastomer/phenolic engineered specifically for wear resistance. The bulk of the seal adjacent the static seal retention cavity typically formed in the rotary cone is molded from an elastomer engineered specifically for precise control of the seal contact force adjacent the dynamic seal face when the seal is compressed against the dynamic face by the seal retention cavity in the cone.

12 Claims, 3 Drawing Sheets

COMPOSITE SEAL FOR ROTARY CONE ROCK BITS

BACKGROUND OF THE INVENTION

I. Field of the Invention

This invention relates to a rotary cone seal with two or more elastomeric materials joined together to form the seal.

More particularly, this invention is a composite seal with two or more elastomeric materials bonded together with further means affixed to the seal to minimize damage to the seal from detritus invading the seal cavity surrounding the seal.

II. Description of the Prior Art

There are a number of prior art patents that teach seals for sealed bearing rotary cone rock bits.

For example, U.S. Pat. No. 3,765,495 describes an earth boring drill employing roller cone cutters with a seal to inhibit ingress of detritus into the cutter bearing area and egress of lubricant therefrom. The seal cavity and adjacent journal is designed to place the seal in hoop compression. The shape of the seal is such that its cross-section is not overly compressed or displaced when in operating position. The seal has a greater radial cross-sectional extent than axial extent by a ratio of at least one-and-one-half to one to conserve bearing space and to provide flexibility to accommodate the various movements of the cutter cone relative to its bearing journal which it is rotatively mounted.

Since the seal is fabricated from a homogeneous resilient material, the portion of the seal adjacent to the journal bearing is exposed to debris and thus, vulnerable to wear that will eventually compromise the seal. The seal, of necessity, has to be flexible enough to maintain the seal in hoop compression as heretofore mentioned. If the seal material is too hard in an attempt to resist abrasion it will not be resilient enough to maintain proper hoop compression.

U.S. Pat. No. 3,788,654 teaches a multiple hardness o-ring seal. A molded ring of partially activated nitrile rubber materials subsequently forms a hardened skin by the process of surface curing the inactivated materials in a solution of a curing agent. The nitrile rubber curing agent provides a secondary curing period which increases the exterior hardness of the seal. The compression set characteristics of the o-ring however are somewhat sacrificed as a result. Furthermore, the hardened skin does not necessarily provide lower friction and/or greater wear resistance.

The harsh environment sealed bearing rock bits are subjected to, demand that the bearing seals adapt to these conditions. For example, hard rock earthen formations subject the roller cone cutters to uneven loads that eventually cause the cones to eccentrically wobble on their respective journal bearings especially after extended run times. In addition, heat buildup caused from depth of bit penetration, weight on bit and relatively high bit rotational speeds challenge the seals to perform despite these deterring factors. Moreover, modern day drilling techniques have resulted in higher bit rotational speeds deeper borehole penetration depths and a greater weight on the bit that further challenges the performance of the rotary cone seals.

The prior art seals, while they exhibited adequate performance under ordinary drilling conditions, lack the necessary composition to withstand the higher performance demanded by drilling operators competing in the petroleum industry.

The present invention teaches the fabrication of a composite seal designed to resist abrasion from borehole detritus and heat from high rotary speeds. In addition, the seal is pliable enough to maintain a seal despite cone wobble and excessive bit weight.

SUMMARY OF THE INVENTION

It is an object of this invention to provide a composite seal for a sealed bearing rotary cone rock bit that protects the cutter cone journal bearings despite increased rock bit operating performance parameters.

A predominantly elastomeric O-ring rock bit seal is fabricated with two or more integrally bonded elastomers or phenolic type materials. The dynamic sealing face typically adjacent the journal bearing is made from an elastomer/phenolic engineered specifically for wear resistance due to sliding wear on the dynamic wear surface and from abrasive wear due to the abrasive slurry being sealed. The bulk of the seal is molded from an elastomer engineered specifically for precise control of the seal contact force adjacent the dynamic seal face when the seal is squeezed.

Moreover, the seal face may be further divided into more specialized functions. For example, one material can be formulated for resisting abrasive wear from the sealed slurry as heretofore mentioned. This material may be a phenolic material and the sliding wear face can be formulated from an elastomer designed for a sliding wear only.

A composite O-ring seal for a sealed bearing rotary cone rock bit is disclosed. The seal is confined within a seal cavity formed between a rotary cutter cone and a bearing journal.

A first elastomer is integrally bonded to at least a second elastomer. The first elastomer that is in contact with a dynamic surface, is wear resistant. The second elastomer has properties that is adapted for precise control of seal contact force while resisting compression set when the seal is squeezed within the seal cavity.

A means is provided for applying contact pressure to the composite seal.

The invention further teaches a barrier material such as a screen mesh that is bonded to the first elastomer in contact with the dynamic surface. The mesh is positioned adjacent to an exterior area that is exposed to detritus material generated during operation of the rock bit in an earthen formation.

The invention is further characterized by a means for applying contact pressure to the composite seal. The seal cavity is preferably formed in the cutter cone. The maximum diameter of the seal cavity is smaller in diameter than the outside diameter of the composite O-ring seal. This dimensioning assures that the seal is subjected to hoop compression forces that maintains constant contact of the first wear resistant elastomer against the dynamic surface formed on the journal bearing.

An advantage then of the present invention over the prior art is the composite O-ring seal with the capability to withstand high frictional wear loads while remaining flexible enough to resist compressibility during rock bit drilling operations.

Yet another advantage of the present invention over the prior art is the addition of a screen mesh bonded to the dynamic portion of the composite seal adjacent the exposed side of the seal to further protect the seal from the harsh elements present during drilling operations.

It is obvious that the dynamic sealing surface may be on the outer diameter of the seal, with the elastomer engineering for control of the seal contact force on the inner diameter. Moreover, the seal may be constructed to have dynamic sealing surfaces on both its outer and inner diameters with the energizing elastomer sandwiched inbetween.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
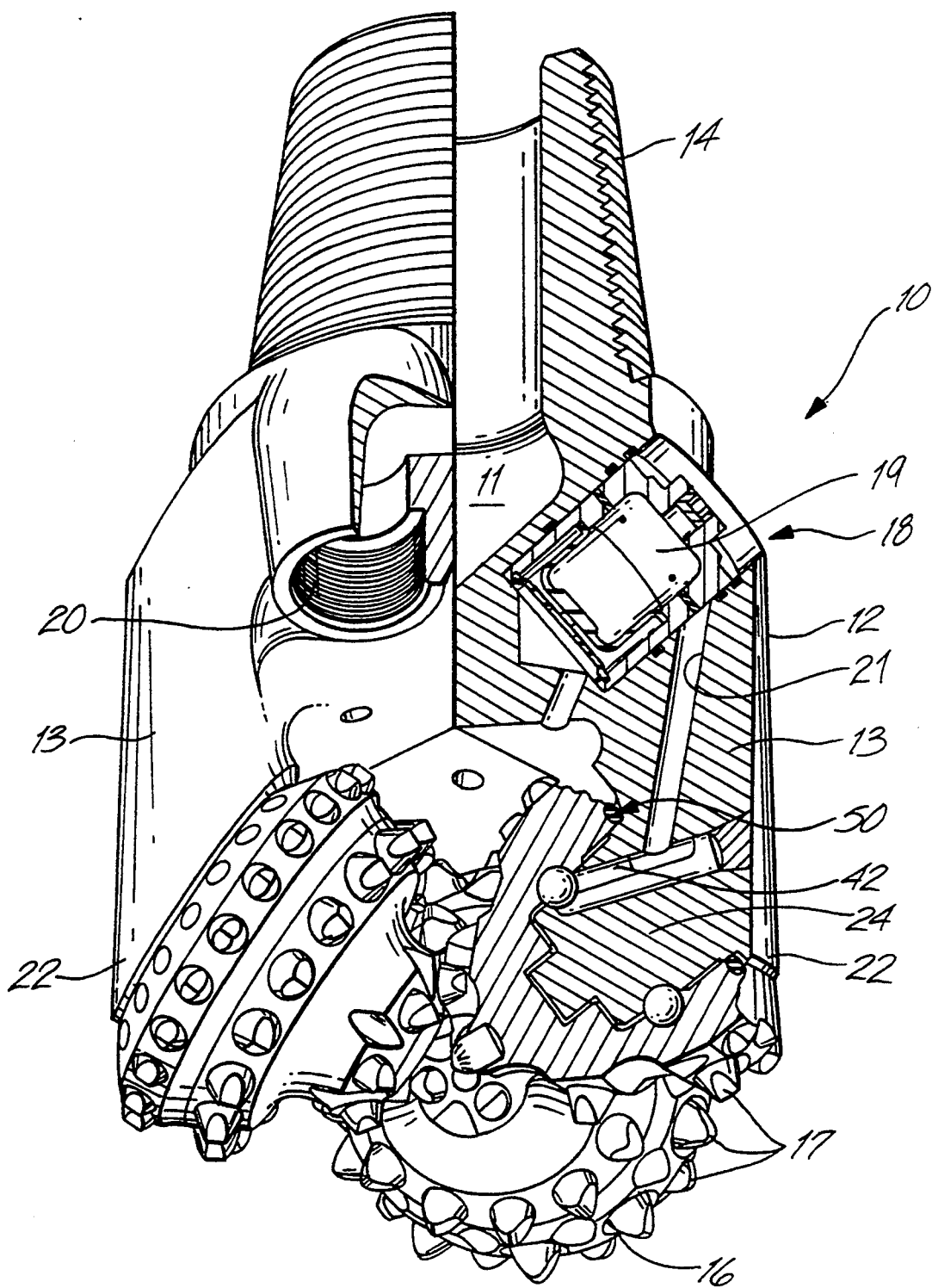
FIG. 1 is a partially cutaway perspective view of a sealed bearing rotary cone rock bit.

Referring now to the partially sectioned perspective view of FIG. 1, a sealed bearing rotary cone rock bit, generally designated as 10, consists of rock bit body 12 forming an upper pin end 14 and a cutter end of rotary cones 16 that are supported by legs 13 extending from body 12. The threaded pin end 14 is adapted to be connected to a drill string (not shown).

Contained within bit body 12 is a grease reservoir system generally designated as 18. Lubricant passages 21 and 42 are provided from the reservoir to rotary cone bearing surfaces formed between a journal bearing 24 and each of the cones 16.

Each of the legs 13 terminate in a shirttail portion 22. Each of the roller cones 16 typically have a multiplicity of tungsten carbide inserts 17 interference fitted within insert sockets formed in the cones.

Drilling fluid is directed within the hollow pin end 14 of the bit 10 to an interior plenum chamber 11 formed by the bit body 12. The fluid is then directed out of the bit through one or more nozzle openings 20. The fluid accelerated through the nozzles serves to cool the rock bit and to clean the debris from the bottom of the borehole as the bit works in a borehole (not shown).

Figure 2:
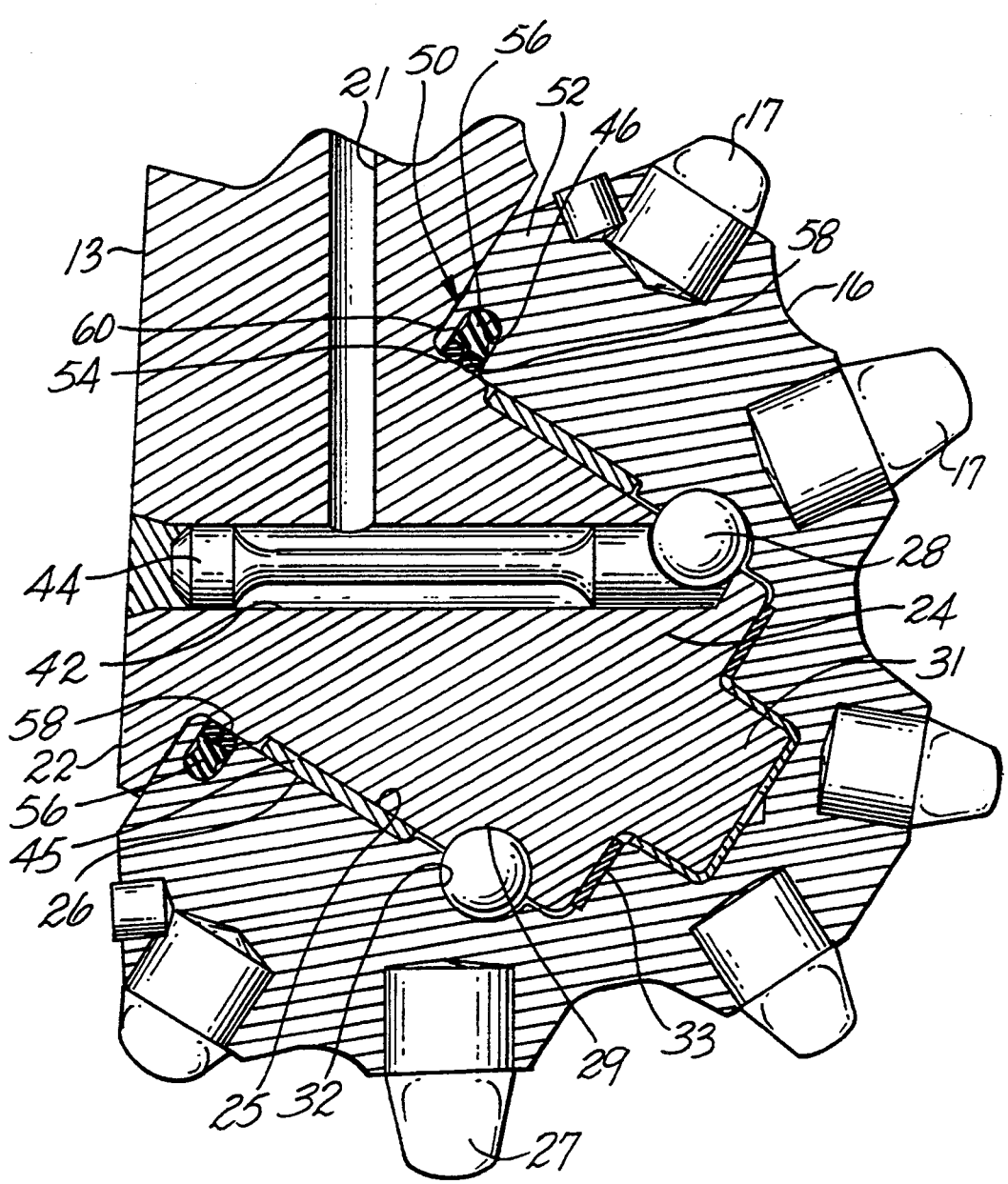
FIG. 2 is a cross-section of a cone mounted to a journal bearing illustrating a seal retained within a seal gland formed within the mouth of the cone, the dynamic surface of the preferred embodiment of the seal is adjacent the base of the journal bearing.

With reference now to both FIGS. 1 and 2, the partially broken away cross-section of leg 13 of the bit illustrates the grease reservoir system in detail. Lubricant contained within chamber 19 of the reservoir is directed through lube passage 21 formed within leg 13. The passage 21 terminates adjacent ball plug hole 42. The ball plug hole 42 serves to admit a multiplicity of cone retention balls 28 to cone retention ball races 29 and 32 formed between journal 24 and cone 16. The balls 28 are passed through the ball plug hole 42, entering a track 29 formed in journal 24. The ball race 29 is indexed with ball race 32 formed in the cone. The ball track is filled with balls 28 and a ball plug 44 is subsequently inserted within the ball plug hole 42 to retain the balls within the ball races 29 and 32. The end of the plug 44 is welded within shirttail 22 of leg 13. Journal 24 extends from leg 13 and forms bearing surface 25. The cone forms bearing surface 26. A floating bearing 45 is disposed between the cone and the journal. A smaller concentric spindle or pilot bearing 31 extends from end 33 of the journal bearing 24 and is retained within a complimentary bearing formed within the cone. A seal generally designated as 50 is positioned within a seal gland formed between the journal 24 and the cone 16.

Figure 3:
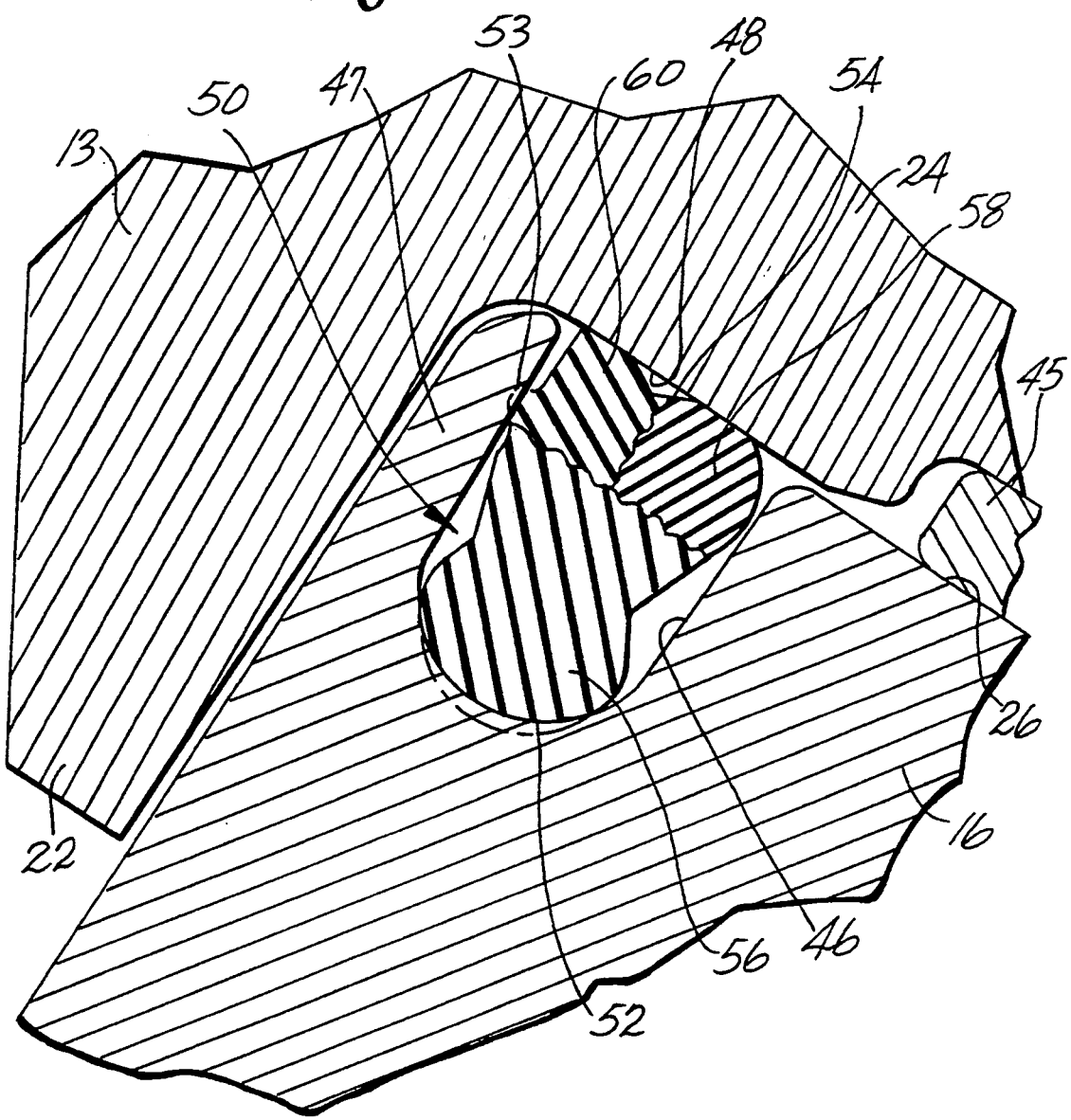
FIG. 3 is an enlarged cross-sectional view of the seal illustrating the various design features.

Referring specifically now to FIGS. 2 and 3, the preferred embodiment of seal 50 consists of an O-ring having a generally oval cross-section. The dynamic sealing face, for example, is made from a material formulated specifically for low friction and wear resistance. The body of the seal is made from a material formulated specifically to maintain its stiffness properties throughout the temperature and chemical environments that the seal encounters, thus a consistent preload on the sliding surface. Therefore, the material for the wear function must emphasize properties of low friction in a sliding motion, low wear in a sliding motion and good resistance to particle abrasion.

Seal 50 is designed to be retained within a U-shaped seal gland groove 46 preferably formed in the cone 16. The outside diameter of the seal 50 is larger in diameter than the diameter of the seal retention groove 46. FIG. 3 illustrates the seal in the unconfined state represented by the phantom line at outer portion 56 of the seal. The seal therefore is placed under hoop compression (the forces being directed radially inwardly) when it is installed within the confines of the bottom 49 of the annular groove 46. The static portion of the seal therefore is adjacent the outer surface 52 of the seal 50 where it contacts the bottom 49 of the groove 46.

The inner dynamic seal face or surface 54 of the seal 50 is adjacent seal bearing surface 48 formed on journal bearing 24.

The seal preferably consists of a formulation of different elastomers that are co-joined and designed to function under unusually harsh rock bit drilling conditions.

For example, with specific reference to FIGS. 2 and 3, the radially outwardly extended elastomer portion 56 of the seal 50 adjacent the bottom 49 of the groove 46, consists of a low compression set material having a constant compression modulus with good dynamic response characteristics that maintain seal compression.

The inner seal portion 58 adjacent dynamic surface 48 (nearest the lubricated bearings) is an elastomeric formulation having the following characteristics; low friction and wear in a sliding motion.

The outer seal portion 60 adjacent the outer environment consists of an elastomer having the following characteristics; low friction and wear with good resistance to particle abrasion.

The same family of elastomers may be used for both materials but with different additives to enhance their specific function.

The chart below gives the preferred seal formulations for elastomer segments 56, 58 and 60:

| ADDITIVE | FUNCTION | PARTS BY WEIGHT | | |
| --- | --- | --- | --- | --- |
| | | BODY MTL (56) | WEAR FACE MTL (58) | WEAR FACE MTL (60) |
| 2207S | HSN POLYMER | 100.0 | 100.0 | 100.0 |
| NAUGARD 445 | ANTIOXIDANT | 1.1 | 1.1 | 1.1 |
| ZMTI | ANTIOXIDANT | 0.4 | 0.4 | 0.4 |
| STEARIC | ACTIVATOR | 0.5 | 0.5 | 0.5 |

-continued

| ADDITIVE | FUNCTION | PARTS BY WEIGHT | | |
|---|---|---|---|---|
| | | BODY MTL (56) | WEAR FACE MTL (58) | WEAR FACE MTL (60) |
| ACID ZINC OXIDE | ACTIVATOR | 5.0 | 5.0 | 5.0 |
| VULCAN 6-LM | REINFORCEMENT CARBON-BLACK | 0.0 | 40.0 | 40.0 |
| N-990 | REINFORCEMENT CARBON-BLACK | 30.0 | 0.0 | 0.0 |
| VUL-CUP 40KE | CURATIVE | 10.0 | 10.0 | 10.0 |
| RICON 153D | CO-AGENT CURATIVE | 4.0 | 4.0 | 4.0 |
| GRAPHITE A99 | FRICTION REDUCER | 0.0 | 15.0 | 15.0 |
| PHENOLIC RESIN | TEAR RESISTANCE | 0.0 | 5.0 | 5.0 |
| KEVLAR FIBER* | TEAR & ABRASION RESISTANCE | 0.0 | 0.0 | 5.0 |

The additives listed above may be obtained from the following suppliers:

| | |
|---|---|
| HSN | Miles, Polysar, Silver Lake, Ohio |
| NAUGARD 445 | Uniroyal Chemical, Middlebury, Connecticut |
| ZMTI | R. T. Vanderbilt, Norwalk, Connecticut |
| STEARIC ACID | C. P. Hall Co., Memphis, Tennessee |
| ZINC OXIDE | R. T. Vanderbilt, Norwalk, Connecticut |
| VULCAN 6-LM | CABOT, Atlanta, Georgia |
| N-990 | J. M. Huber, Akron, Ohio |
| VUL-CUP 40KE | Hercules, Wilmington, Delaware |
| RICON 153D | Colorado Chemical, Golden, Colorado |
| GRAPHITE A99 | Superior Graphite, Chicago, Illinois |
| PHENOLIC RESIN | Occidental Chemical, North Tonawanda, N.Y. |
| KEVLAR FIBER 6F568 | E. I. Dupont, Wilmington, Delaware |

The percent by weight of rubber hydrocarbons (R.H.C.) formulating the wear face material 60 is as follows:

| | |
|---|---|
| HSN POLYMER | 53.763 |
| NAUGARD 445 | .591 |
| ZMTI | .215 |
| STEARIC ACID | .269 |
| ZINC OXIDE | 2.688 |
| VULCAN 6-LM | 21.505 |
| VUL-CUP 40KE | 5.376 |
| RICON 153D | 2.151 |
| GRAPHITE A99 | 8.065 |
| PHENOLIC RESIN | 2.688 |
| KEVLAR FIBER | 2.688 |
| EQUALS | 100.00 |

The percent by weight of R.C.H. formulating the wear face material 58 is as follows:

| | |
|---|---|
| HSN POLYMER | 55.249 |
| NAUGARD 445 | .608 |
| ZMTI | .222 |
| STEARIC ACID | .276 |
| ZINC OXIDE | 2.762 |
| VULCAN 6-LM | 22.099 |
| VUL-CUP 40KE | 5.525 |
| RICON 153D | 2.210 |
| GRAPHITE A99 | 8.287 |
| PHENOLIC RESIN | 2.762 |
| EQUALS | 100.00 |

The percent by weight of R.C.H. formulating the body material 56 is as follows:

| | |
|---|---|
| HSN POLYMER | 66.225 |
| NAUGARD 445 | .728 |
| ZMTI | .265 |
| STEARIC ACID | .331 |
| ZINC OXIDE | 3.311 |
| N-990 | 19.868 |
| VUL-CUP 40KE | 6.623 |
| RICON 153D | 2.649 |
| EQUALS | 100.00 |

The novel elastomer material combinations are molded to the desired o-ring seal cross-section using well known, state of the art molding techniques.

The durometer hardness of the elastomeric wear materials 58 and 60 is between 80 and 100. The durometer hardness of materials 58 and 60 is preferably 85 to 90.

The durometer hardness of elastomeric material 56 is between 60 and 80. The durometer hardness of material 56 is preferably between 65 and 70.

Figure 4:
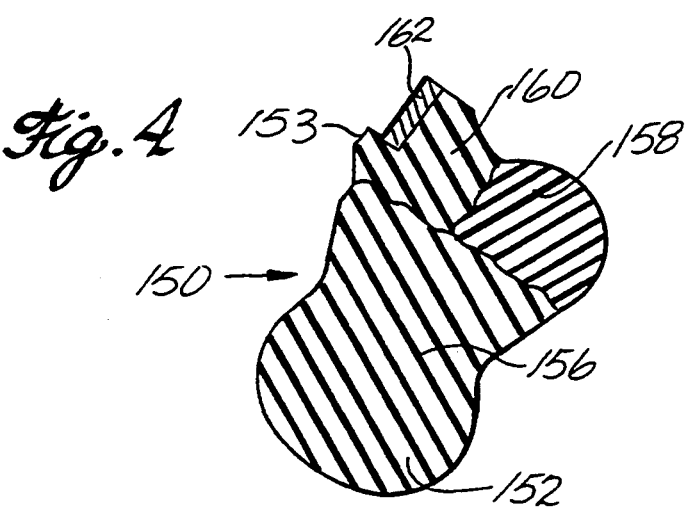
FIG. 4 is an enlarged cross-sectional view of an alternative embodiment of the O-ring seal.

Referring now to FIG. 4, the alternative seal includes a seal protection feature consisting of a metal wire mesh 162 that is bonded to, or encapsulated within the seal segment 160 of composite seal generally designated as 150. Elastomeric segments 156, 158 and 160 are comparable to those material combinations set forth for seal 50 of FIGS. 1 through 3.

The protection element 162 may be, for example, selected from steel, brass, or bronze. Moreover, the protection element may be a thermo-plastic such as polytetraflouroethylene (PTFE). Graphite is another material that could be utilized.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A composite O-ring seal for a sealed bearing rotary cone rock bit, the seal being confined within a seal cavity formed between a rotary cutter cone and a journal bearing comprising:

a first elastomer integrally bonded to at least a second elastomer, said first elastomer in contact with a dynamic bearing surface being wear resistant, the first elastomer material consists of about 55 percent by wht. of HSN polymer, about 0.8 percent by wht. of an antioxidant, about 3 percent by wht. of an activator, about 22 percent by wht. of carbon black, about 8 percent by wht. of a curative and about 8 percent by wht. of graphite, said second elastomer having properties adapted for precise control of seal contact force while resisting compression set when the seal is squeezed within said seal cavity, and means for applying contact pressure to said composite seal.

2. The invention as set forth in claim 1 wherein the second elastomer material consists of about 66 percent by wht. of HSN polymer, about 0.8 percent by wht. of an antioxidant, about 3 percent by wht. of an activator, about 20 percent by wht. of carbon black and about 8 percent by wht. of a curative.

3. The invention as set forth in claim 1 further comprising a third wear resistant elastomer bonded to said first elastomer and to said second elastomer, said first and third elastomers being in contact with said dynamic bearing surface, said third elastomer being positioned adjacent an exterior side of said seal, said third elastomer containing a tear and abrasion resistant ingredient to further inhibit admittance of detritus into the dynamic bearing surface.

4. The invention as set forth in claim 3 wherein the third elastomer material consists of about 55 percent by wht. of HSN polymer, about 0.8 percent by wht. of an antioxidant, about 3 percent by wht. of an activator, about 22 percent by wht. of carbon black, about 8 percent by wht. of a curative, about 8 percent by wht. of graphite and about 3 percent by wht. of a tear and abrasion resistance material.

5. The invention as set forth in claim 1 further including a barrier material bonded to said first elastomer in contact with said dynamic bearing surface, said barrier material being adjacent an exterior area exposed to detritus material generated during operation of said rock bit in an earthen formation.

6. The invention as set forth in claim 5 wherein said barrier material is a screen mesh.

7. The invention as set forth in claim 6 wherein the barrier material is selected from the group consisting of steel, brass and bronze.

8. The invention as set forth in claim 6 wherein the barrier material is a thermo-plastic.

9. The invention as set forth in claim 6 wherein the thermo-plastic is polyimid or polytetraflouroethylene.

10. The invention as set forth in claim 6 wherein the barrier material is graphite.

11. The invention as set forth in claim 1 wherein the durometer hardness of the first wear resistance elastomeric material is about 90.

12. The invention as set forth in claim 1 wherein the durometer hardness of the second elastomeric material is from 65 to 70.

* * * * *